United States Patent

Smith

[15] 3,644,841
[45] *Feb. 22, 1972

[54] FREQUENCY-STABILIZED SINGLE MODE RING LASERS

[72] Inventor: Peter William Smith, Little Silver, N.J.
[73] Assignee: Bell Telephone Laboratories, Incorporated, Murray Hill, N.J.
[ * ] Notice: The portion of the term of this patent subsequent to Oct. 27, 1987, has been disclaimed.
[22] Filed: May 4, 1970
[21] Appl. No.: 34,440

Related U.S. Application Data

[63] Continuation-in-part of Ser. No. 656,519, July 27, 1967, Pat. No. 3,537,027.

[52] U.S. Cl. ................................331/94.5, 356/106 LR
[51] Int. Cl. ..................................H01s 3/00, G01b 9/02
[58] Field of Search ......................331/94.5; 356/106 LR

[56] References Cited

UNITED STATES PATENTS 3,537,027  10/1970  Smith.................................331/94.5

OTHER PUBLICATIONS

Bistable Traveling- Wave Oscillations of Ion Ring Laser; Rigrod et al.; IEEE Jour of Quantum Electrons; Vol. QE- I No. 7; Oct. 1965 pg. 298– 303.

Primary Examiner—Ronald L. Wibert
Assistant Examiner—V. P. McGraw
Attorney—R. J. Guenther and Arthur J. Torsiglieri

[57] ABSTRACT

A sensitive frequency discriminant based on the gain profile of the active medium can be obtained in an ion ring laser having a Doppler-broadened emission line by promoting stable competition between oppositely propagating traveling-wave components of a single transverse mode and by tuning an auxiliary ring resonator that determines the frequency of the primary ring resonator to maintain substantially equal intensities of the oppositely propagating waves. The discriminant is then used to stabilize the auxiliary ring resonator. The primary ring resonator is stabilized by locking one of its resonant frequencies to a resonance of the auxiliary ring resonator with a feedback circuit. Stable competition is achieved by providing a selected gain anisotropy of the ion laser active medium. The anisotropy is selected to be sufficiently large to inhibit the quenching of one of the oppositely propagating waves by the other, even though they have the same frequency. In the typical case of a gas ion laser, a substantial ion drift rate provides the gain anisotropy.

6 Claims, 5 Drawing Figures

FREQUENCY-STABILIZED SINGLE MODE RING LASERS

CROSS-REFERENCE TO RELATED APPLICATION

This is a continuation-in-part of my copending application, Ser. No. 656,519, now U.S. Pat. No. 3,537,027, filed July 27, 1967.

BACKGROUND OF THE INVENTION

This invention relates to lasers and more particularly to apparatus for controlling the output frequency of a laser.

The development of lasers has made possible the generation and amplification of coherent electromagnetic waves in the optical frequency range, generally considered to extend from the farthest infrared portion of the spectrum through the ultraviolet. Due to the extremely high frequencies associated with wave energy in this light range, the coherent waves produced by lasers are capable of transmitting enormous quantities of information. The resultant extension of the usable portion of the electromagnetic spectrum has greatly increased the number of frequency channels available for communication and other uses.

In many actual and potential applications of the laser, such as communications, it is desirable that the laser output frequency have a high degree of stability. Nevertheless, the output of a laser is subject to frequency variations resulting from magnetic, thermal and other environmental fluctuations that effect the geometry and dimensions of the device.

In my copending patent application, Ser. No. 553,482, now U.S. Pat. No. 3,484,719, filed May 27, 1966, which issued Dec. 16, 1969, I have proposed one technique for stabilizing the output frequency of a laser to a resonance of a stable auxiliary resonator, which may be coupled to the primary laser resonator. Most such proposals are only as effective as the inherent stability of the auxiliary resonator. For additional improvement, it is necessary to supply an additional technique for stabilizing the frequency characteristics of the auxiliary resonator.

For example, one might seek to stabilize the auxiliary resonator to the natural line center of the active medium. The nature line center is that frequency at which the active medium can emit the greatest intensity of coherent radiation, and can be determined by tuning the laser resonator through a range of frequencies. The natural emission line of a laser has an appreciable width in terms of frequency because of broadening effects, such as the Doppler broadening, which is produced by the random thermal motions of the atoms of the active medium. A technique for stabilizing a resonator to the natural line center may be found in the copending patent application of R. L. Fork and W. J. Tomlinson, Ser. No. 584,501, filed Oct. 5, 1966, now U.S. Pat. No. 3,496,488, and assigned to the assignee hereof. That technique is limited to a certain class of transitions in suitable materials. A more general technique is disclosed in the copending patent application of R. L. Fork, Ser. No. 434,883, filed Feb. 24, 1965, now U.S. Pat. No. 3,395,365, and assigned to the assignee hereof; but a greater sensitivity may be desired in some applications. In addition, the plurality of modes required by the latter technique may be objectionable in some applications.

Sensitivity, as used above, refers to the extent of variation of the error signal as the resonator is tuned through a band of frequencies around the natural line center. The variation of error signal of the frequency control system with respect to tuning will hereinafter be referred to as the "frequency discriminant." From the foregoing, it may be seen that a desirable frequency discriminant would be one that is both generally applicable to a broad class of lasers and also has improved sensitivity as compared to other generally applicable techniques.

In my copending parent patent application, Ser. No. 656,519, now U.S. Pat. No. 3,537,027, filed July 27, 1967, and assigned to the assignee hereof, a sensitive frequency discriminant based on the natural line center of the active medium is obtained in a ring laser having a Doppler-broadened emission line by promoting stable competition between oppositely propagating traveling-wave components of a single transverse mode and by tuning an auxiliary ring resonator that is coupled to the primary ring resonator to maintain substantially equal intensities of the oppositely propagating waves. Specifically, stable competition is achieved by a nonreciprocal device that splits the resonances of the auxiliary ring resonator by an integral number of the frequency spacings between longitudinal modes of the primary ring resonator.

SUMMARY OF THE INVENTION

According to my present invention, stable competition is achieved by means of a selected gain anisotropy of the active medium. In the preferred embodiment, the ion drift in a gas ion active medium provides the gain anisotropy. Coupled primary and secondary ring resonators are tuned to provide a common resonance of the primary and auxiliary ring resonators near the natural line center of the laser active medium.

My present invention advantageously employs the highly mode-selective ring resonator configuration disclosed in my copending patent application, Ser. No. 656,473, now U.S. Pat. No. 3,575,667, filed July 27, 1967, and assigned to the assignee hereof.

BRIEF DESCRIPTION OF THE DRAWING

Further features and advantages of my present invention may be understood from the following detailed description, taken together with the drawing, in which.

DESCRIPTION OF ILLUSTRATIVE EMBODIMENTS

Figure 1:
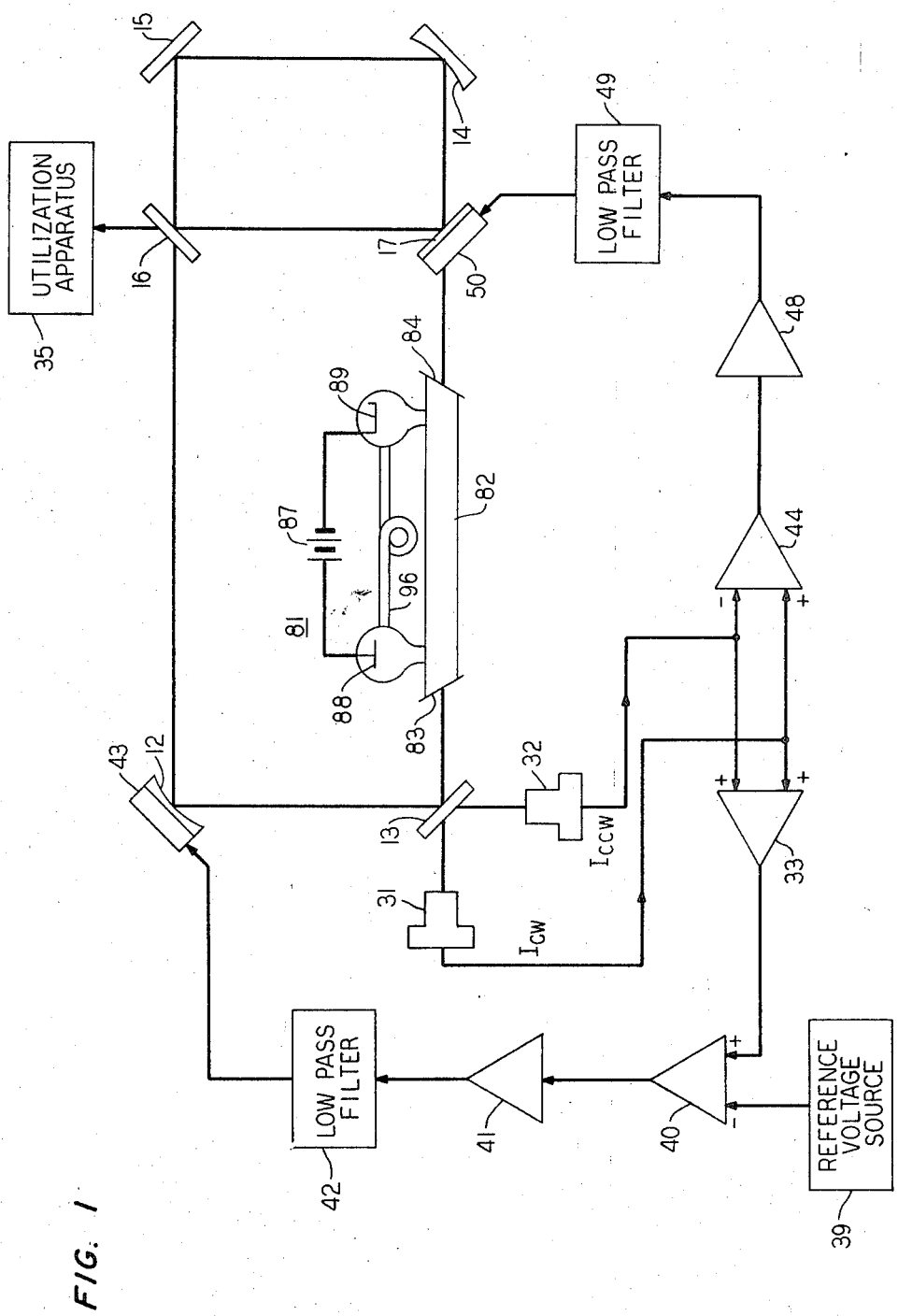
FIG. 1 is a partially pictorial and partially block diagrammatic illustration of an embodiment of the invention for controlling the output frequency of a gas ion laser.

In the embodiment of FIG. 1, an ion gas laser 81 is provided with frequency stabilization according to my present invention. For example, the laser 81 could be an argon ion laser operating on the transition at 4,880 Angstrom units. The compound ring resonator permits each of the two oppositely propagating wave components to oscillate only in a single longitudinal mode. Reflectors 12, 13, 14 and 15 form a primary ring resonator having a light propagation path passing along the axis of the active medium of laser 11. The partially transmitting reflectors 16 and 17, together with reflectors 14 and 15, form an auxiliary ring resonator having a light propagation path that overlies a portion of the light propagation path of the primary ring resonator. Reflectors 16 and 17 not only serve to couple the primary and auxiliary ring resonators, as will be more fully explained below, but are also oriented to direct out of the laser those modes of either direction of propagation that are not resonant in both the primary and auxiliary ring resonators. As explained in my above-cited patent application, Ser. No. 656,473, now U.S. Pat. No. 3,575,667, this arrangement of reflectors is capable of giving sharp mode selection.

The control system is as follows. The primary ring resonator is stabilized to a resonance of the auxiliary ring resonator through a circuit comprising the phototubes 31 and 32 which respectively detect portions of the clockwise and counterclockwise propagating waves, as coupled out through the partially transmissive reflector 13. The outputs of the phototubes 31 and 32 are additively amplified by an amplifier 33. The signal from amplifier 33 is then compared to a stable reference voltage from source 39 by difference amplifier 40 to produce the desired error signal which is indicative of any needed tuning of the primary ring resonator. This error signal is amplified by the power amplifier 41 and filtered by the low-pass filter 42 to eliminate spurious high-frequency signals. The resulting error signal is applied to the piezoelectric driver 43, which in known manner adjusts the position of reflector 12 to tune the primary ring resonator in the sense that will counteract the deviation of the laser output frequency. If desired, the error signal can be normalized to take account of fluctuation of total output power from beam splitters 16 and 17. A suitable normalization scheme is disclosed in my copending patent application, Ser. No. 641,646, filed May 26, 1967, now U.S. Pat. No. 3,486,131.

The auxiliary resonator is stabilized with respect to the natural line center of the active medium by means of a feedback circuit that also acts upon the output signals of phototubes 31 and 32. The signals are applied to the difference amplifier 44 to produce an output signal indicative of the difference of their magnitudes. The difference signal is then amplified by power amplifier 48, and is filtered by low-pass filter 49. The resulting error signal is then applied to piezoelectric driver 50 to tune the auxiliary resonator by varying the position of the reflector 17. Tuning is accomplished by varying the position of reflector 17 in the sense that tends to reduce the error signal and the deviation of the resonant frequency of the auxiliary resonator from the natural line center of the active medium of laser 11. If desired, the error signal can be normalized in the same way as the other error signal, for example, as disclosed in my above-cited U.S. Pat. No. 3,486,131.

Typically, low-pass filter 49 will have a much lower cutoff frequency than low-pass filter 42, in order to insure stability of the dual feedback system.

The reflectors 12 and 14 are illustratively curved to focus the laser radiation in order to reduce its diffraction loss. Reflectors 12, 14 and 15 are highly reflective and substantially nontransmissive; and reflector 13 is only slightly transmissive to the degree required to drive the control signals. The transmissivities of reflectors 16 and 17 may be selected from a range of values depending upon the mode selectively desired. For a gain of laser 11 of about 10 percent per pass, the reflectivities of reflectors 16 and 17 are illustratively about 60 percent.

The utilization apparatus 35 may illustratively include a photodetector, or other apparatus for utilizing a portion of the output radiation. The frequency stability of the output radiation makes it useful in many laboratory measurements such as lengths and time measurements.

The difference amplifiers 44 and 40 may be standard comparison amplifiers, or difference amplifiers, of the type conventionally used in the automatic control art. The summing amplifier 33 is also conventional. The power amplifiers 41 and 48 and low-pass filters 42 and 49 are also conventional.

The ion drift in the ion laser 81 permits the Faraday rotator and quarter-wave plates of FIG. 1 of my copending parent application, Ser. No. 656,519, now U.S. Pat. No. 3,537,027, to be completely eliminated from the apparatus. Typically, the ion laser 81 would be an argon ion laser including argon gas contained in the tube 82 and excited by a direct current power source 87 connected between the anode 88 and cathode 89. An ion return path 90, somewhat longer than the discharge length of the tube, is provided between the anode and the cathode. A continuous circulation of ions results, which circulation produces two distinctive gain curves with respect to frequency for the oppositely propagating waves as shown in curves 101 and 102 of FIG. 2B.

The operation of the embodiment of FIG. 1 may be more specifically explained as follows. The first feedback circuit that employs the sum of the signals from phototubes 31 and 32 is responsive to deviations of the resonances of the primary ring resonator from the relatively more stable resonance of the auxiliary ring resonator. This relationship exists for the following reasons. If the auxiliary ring resonator is assumed stable, changes in the total internal power of the primary ring resonator correspond closely to fluctuations in the resonant frequencies of the primary ring resonator when the combination of reflectors has been initially adjusted to provide near-maximum power output in the signal reflected from the partially reflective reflector 16. This fact is more fully explained in my first above-cited U.S. Pat. No. 3,484,719. In particular, it is there demonstrated that no power output from reflector 16 is obtained for extremely high or low levels of internal power in the laser and that a maximum power output is always obtained for some intermediate level of the internal power level within the laser. The internal power level is always a rapidly varying function of tuning near the point of maximum output power.

These principles are applicable to the ring laser configuration shown in the embodiment of FIG. 1. The sum signal from the amplifier 33 may be readily recognized as being proportional to the total internal power level within the primary ring resonator and will indicate deviations in tuning of the primary ring resonator, assuming that the power-versus-tuning characteristics of the laser have not fluctuated substantially because of changes in the excitation from source 57 or of loss-producing effects within the active medium of laser 11.

In order to compensate for the latter disturbances, the sum signal can be normalized with respect to output power, as mentioned above. In view of the flatness of the output characteristic near the maximum power point, fluctuations in that output power are measures of the foregoing disturbances. It is assumed that these disturbances affect internal power substantially proportionally. The normalization is accomplished by a conventional technique for obtaining a quotient, and the resulting signal is applied to vary the position of reflector 12 by substantially conventional techniques.

The operation of a second feedback circuit to stabilize the auxiliary ring resonator to the natural line center of the active medium may be explained more specifically as follows.

With the two ring resonators coupled together as shown in FIG. 1, the effect of the auxiliary ring resonator is to act as a variable reflector for the primary ring resonator. Specifically, for the mode which is resonant in both of the resonators, an interference effect occurs at the partially transmissive reflectors 16 and 17 which reduces the output coupling below the value which would be determined solely by the reflectivities of those reflectors. The laser will tend to operate in a single mode determined by the frequency coincidence of modes of the primary ring resonator with the transmission peaks of the auxiliary ring resonator.

Stable composition between the oppositely propagating wave components of a single transverse mode in the ring laser is achieved by means of ion drift in the active medium in tube 82 of laser 81 of FIG. 1.

Figure 2A:
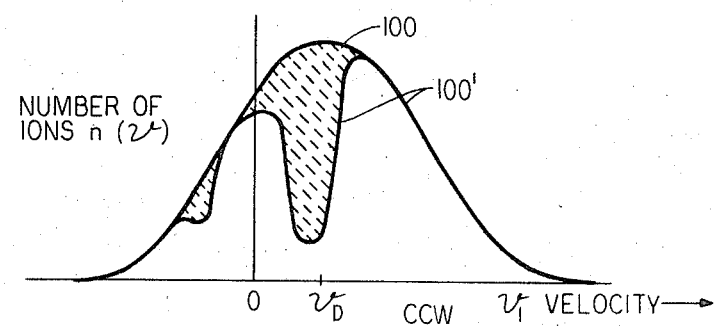
FIGS. 2A, 2B, 2C and 2D show curves that are useful in understanding the theory and operation of the embodiment of FIG. 1.
Figure 2B:
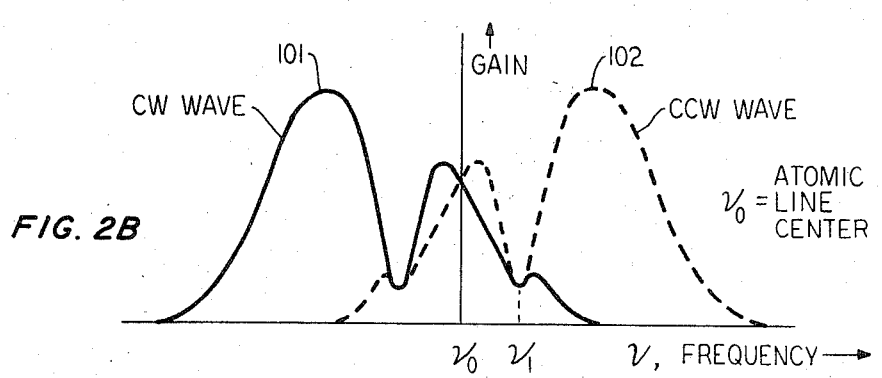

With a small amount of splitting of the peak gains of the laser for the two directions in the primary ring of the type shown by curves 101 and 102 in FIG. 2B, but with less separation, one direction of traveling-wave oscillation at the common resonant frequency of the two resonators will predominate. The traveling-wave oscillation in the other direction would tend to be quenched; and the laser would operate in a unidirectional traveling-wave mode. Stable competition can be provided by increasing the splitting, as by increasing the ion drift rate. I have determined a suitable splitting of about 800 MHz, which is the spacing between the peaks of the curves 101 and 102 in FIG. 2A. The corresponding ion drift rate can be determined experimentally for a given ion-active medium.

Moreover, the 800 MHz. splitting for the peak gains in the two directions is most appropriate for an argon ion laser active medium, which has about 10 percent gain per pass in its usual form. Other splittings may be found to be appropriate for other ion laser media and other gain values of the argon ion laser. Again, the ion drift rate is varied experimentally until stable competition is achieved, i.e., a rapid change in relative amplitudes of the oppositely propagating waves as the auxiliary resonator is tuned, without mutual quenching.

The curve which can uniquely characterize the ionized active medium is curve 100 of FIG. 2A which depicts a number of ions, $n(v)$ versus $v$, the velocity of those ions. The peak of this curve falls at the average drift velocity, $v_D$. The single transverse mode, with its oppositely propagating wave components, will draw its energy from two velocity groups of atoms within the curve 100, thereby "burning holes" in the curve as shown by modified curve 100' of FIG. 2A. Since oppositely propagating waves, if they have substantially the same frequency, present apparently different frequencies to atoms moving relative to them along the same axis, the two contributing velocity groups of atoms will be disposed on either side of the zero-velocity axis.

Now let us assume for the moment that the single resonant transverse mode in the laser includes a counterclockwise-propagating component at substantially the same frequency $\nu_1$ as the clockwise-propagating component, $\nu_1$ being substantially removed from the natural line center frequency, $\nu_0$. In the absence of any interaction between the clockwise-propagating waves and the counterclockwise-propagating waves, the difference in intensities of the oppositely propagating waves would be essentially as illustrated by curve 103 of FIG. 2C.

Figure 2C:
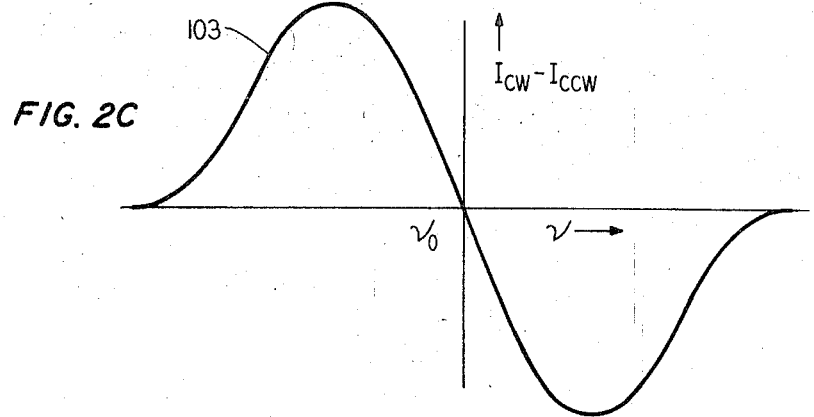

The values of the curve 103 in FIG. 2C may be derived by moving the coinciding holes in FIG. 2B on the appropriate side of the ordinate to each value of frequency in question and measuring the difference in area of the coinciding holes. The holes tend to become wider as moved toward higher values of gain.

Figure 2D:
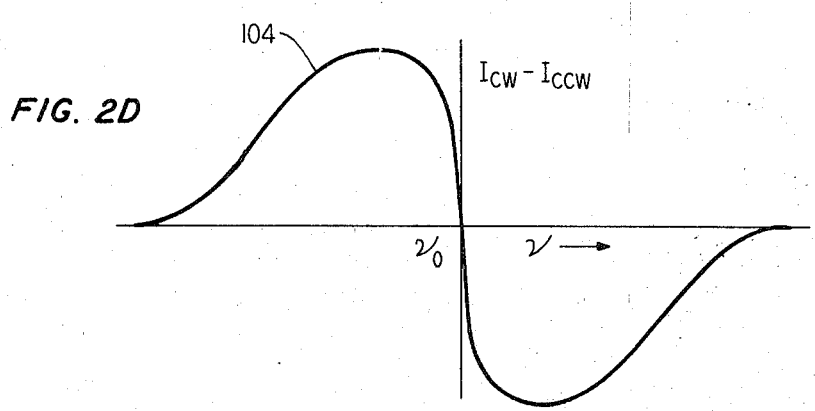

If the frequency of the oppositely propagating waves is brought close to $\nu_0$, where $\nu_0$ is the natural line center of the active medium, then some atoms will interact with both the clockwise and counterclockwise propagating waves. The resulting competition between these waves will cause the plot of FIG. 2C to be changed, in the vicinity of $\nu_0$, to that of FIG. 2D. Curve 104 of FIG. 2D has a sharper slope in the region of $\nu+\nu_0$ than does curve 103 of FIG. 2C.

In the operation of the embodiment of FIG. 1, the auxiliary ring resonator is initially adjusted to support a mode of the primary ring resonator that is very near the natural line center, $\nu_0$. The feedback circuit including the difference amplifier 44 detects the intensity difference of the oppositely propagating waves to produce a signal of a form shown in FIG. 2D. When this signal is employed to drive the piezoelectric driver 50 as shown to reduce the error signal, the intensities of the oppositely propagating waves are maintained substantially equal.

Other parameters of the illustrative argon in laser embodiment are as follows.

The effective width of the gain curve 100 of FIG. 2A is 3,500 MHz. I suggest that the splitting of the peak gains of curves 101 and 102 of FIG. 2B, which is 800 MHz for the embodiment of FIG. 1, will for other ion lasers be directly related to the effective width of the gain curve.

The so-called homogeneous linewidth for the embodiment of FIG. 1 is about 400 MHz; and the discriminant width, i.e., the linear portion of curve 103 of FIG. 2C, will be about 40 MHz, or about one-tenth of the homogeneous linewidth for most ion lasers. The homogeneous linewidth is approximately the width of the holes burned in curves 101 and 102 of FIG. 2B.

I claim:

1. Apparatus for generating frequency-controlled coherent electromagnetic wave energy, of the type comprising
   a primary optical ring resonator,
   an active medium disposed in said primary resonator, said medium being capable of supporting oppositely propagating traveling-wave oscillations within said resonator,
   means for pumping said active medium at a level sufficient to support said oscillations within said active medium,
   an auxiliary optical ring resonator disposed within said primary ring resonator and coupled to said primary ring resonator by beam splitters oriented to direct out of said apparatus oscillations that are not resonant in both said primary and said auxiliary resonators,
   feedback means for tuning said primary resonator to stabilize its resonance with respect to the resonances of said auxiliary resonator,
   said apparatus being characterized, in that,
   said active medium is an ionized gaseous medium,
   said pumping means promotes ion drift within said active medium to provide a selected splitting of peak gains for said oppositely propagating oscillations, said splitting being selected to provide a smoothly varying intensity difference of said oppositely propagating oscillations with tuning of said auxiliary resonator, and
   feedback means responsive to said intensity difference for tuning said auxiliary resonator to stabilize the intensity difference of the oppositely propagating waves.

2. Apparatus according to claim 1 in which the active medium is a drifting ionized gaseous medium in which the splitting of the peak gains is a substantial portion of the width of the effective gain curve.

3. Apparatus according to claim 1 in which the active medium is a drifting ionized gaseous medium in which the splitting is greater than about one-fifth of the gain curve width.

4. Apparatus according to claim 1 in which the active medium is a drifting ionized gaseous medium in which the splitting is greater than the homogeneous linewidth of the active medium.

5. Apparatus according to claim 1 in which the active medium is a drifting ionized gaseous medium in which the splitting is about twice the homogeneous linewidth of the medium.

6. Apparatus according to claim 1 in which the active medium is a drifting ionized argon gas in which the splitting is about 800 MHz.

* * * * *